INVENTORS
ROBERT T. SHARKEY
RALPH L. WESTERMAN
BY John M. Koch
Q. Baxter Warner
ATTORNEYS

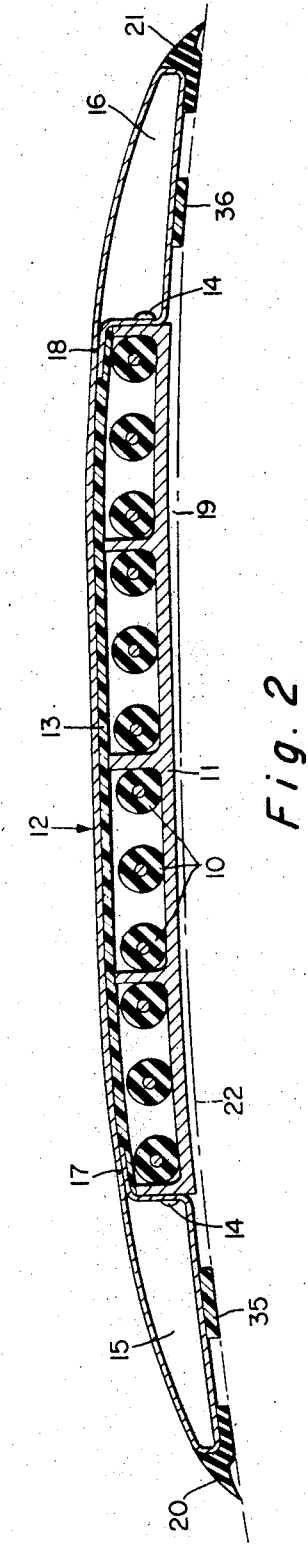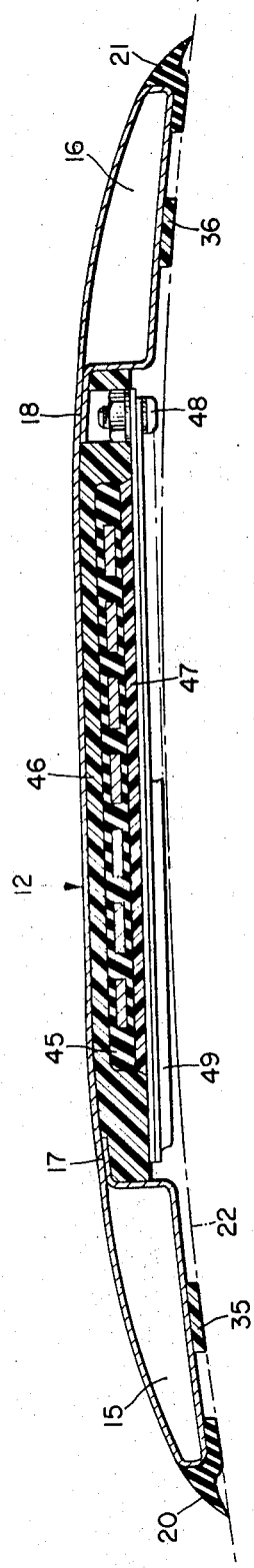

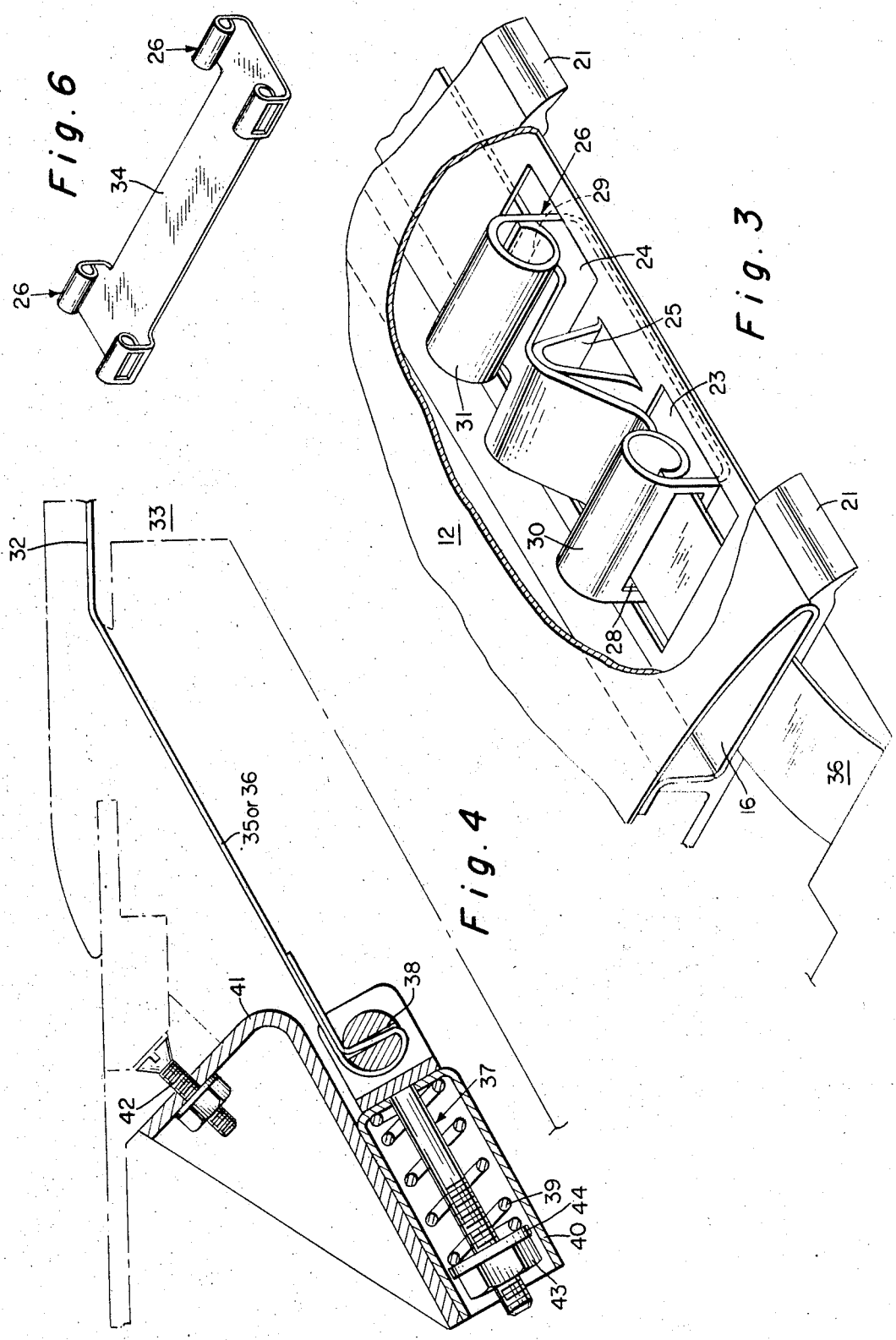

United States Patent Office 3,424,855
Patented Jan. 28, 1969

3,424,855
ELECTRICAL CONDUCTOR ATTACHMENT
MEANS
Robert T. Sharkey, San Jose, and Ralph L. Westerman,
Cupertino, Calif., assignors, by mesne assignments, to
the United States of America as represented by the
Secretary of the Navy
Filed Sept. 27, 1966, Ser. No. 583,116
U.S. Cl. 174—97          5 Claims
Int. Cl. H02g 3/28

ABSTRACT OF THE DISCLOSURE

A conduit for electrical cables and a means for anchoring same to a surface. It includes anchoring brackets affixed at intervals along the surface and received within registering apertures in the underside of the conduit. A flexible strap is woven between aligned strap engaging surfaces on the conduit and each bracket. When placed under tension the strap urges the conduit against the surface.

---

The invention described herein may be manufactured and used by or for the Government of the United States of America for governmental purposes without the payment of any royalties thereon or therefor.

This invention relates to attachment means for mounting electrical conductors upon the surface of an object, and particularly to such means for fastening insulated electrical conductors to the outside surface of a missile.

In some types of missiles, electrical conductors are used to conduct electrical power from the aft end to the forward end of the rocket motor in each stage of the missile. These electrical conductors generally are insulated and suitably enclosed in rubber sleeves or metal covers which, in turn, are securely fastened to the outside surface of the rocket motor. When rubber sleeves are used, they usually are bonded to the motor surface with the aid of suitable adhesives. In the use of metal covers for this purpose, the covers usually are slotted and screwed to the brackets which, in turn, are bonded to the outside surface of the motor by the use of suitable adhesives.

Among the disadvantages experienced in the use of such prior art rubber or metal attachment means are difficult installment, removal and repair characteristics. Furthermore, suitable attachment means should provide both electrical and thermal insulation to the electrical conductors and should not shake loose from its moorings during periods of intensive vibration. In addition to exhibiting a high degree of durability, the attachment means should provide ready accessibility for inspection of the electrical conductors, as well as the various parts of the attachment means, and should insure sufficient clearances for rocket motor thermal expansion and contraction, both longitudinally and circumferentially, during heating and cooling stages, respectively.

Accordingly, it is an important object of this invention to provide electrical conductor attachment means that are characterized by exhibiting convenient installation, removal and repair features.

Another object of this invention is to provide such electrical conductor attachment means of light weight, for use on the outside surface of a missile or rocket motor, which will exhibit a high degree of durability and withstand intense, prolonged vibration conditions.

A further object of this invention is to provide attachment means of the type described, which will provide both electrical and thermal insulation to the attached electrical conductors and incorporate adequate clearance characteristics for rocket motor-induced thermal expansion and contraction.

It is also an object of this invention to provide rocket motor electrical conductor attachment means which permit ready accessibility to the electrical conductors and the attachment means components for inspection, repair and checkout purposes.

Additional objects of the invention will become apparent from the following description, which is given primarily for purposes of illustration, and limitation.

Stated in general terms, the objects of the invention are attained by providing electrical conductor attachment means which include: conduit means for housing the electrical conductors; a plurality of anchor bracket means cooperatively associated with the conduit; and preferably bonded with adhesive to an attachment surface; at least one strap means adapted for lashing the conduit means to the anchor bracket means; and fastening means for fastening the ends of the strap means to the surface of a body, such as a rocket motor.

A more detailed description of specific embodiments of the invention is given below with reference to the accompanying drawings, wherein:

FIG. 2 is a vertical sectional view, taken as along line 2—2 of FIG. 1, showing the attachment means of FIG. 1 in assembled form;

FIG. 3 is a partial, isometric, detail view, with portions broken away and drawn to an enlarged scale, showing an anchor bracket, conduit and strap assembly;

FIG. 4 is a partial vertical sectional detail view, drawn to an enlarged scale, showing an expansion and contraction compensator securement at the end of a strap;

FIG. 5 is a vertical sectional view, similar to that of FIG. 2, showing an assembly of the attachment means adapted for use with a flat electrical conductor cable; and FIG. 6 is an isometric detail view, drawn to an enlarged scale, showing a pair of coupled anchor brackets.

Figure 1:
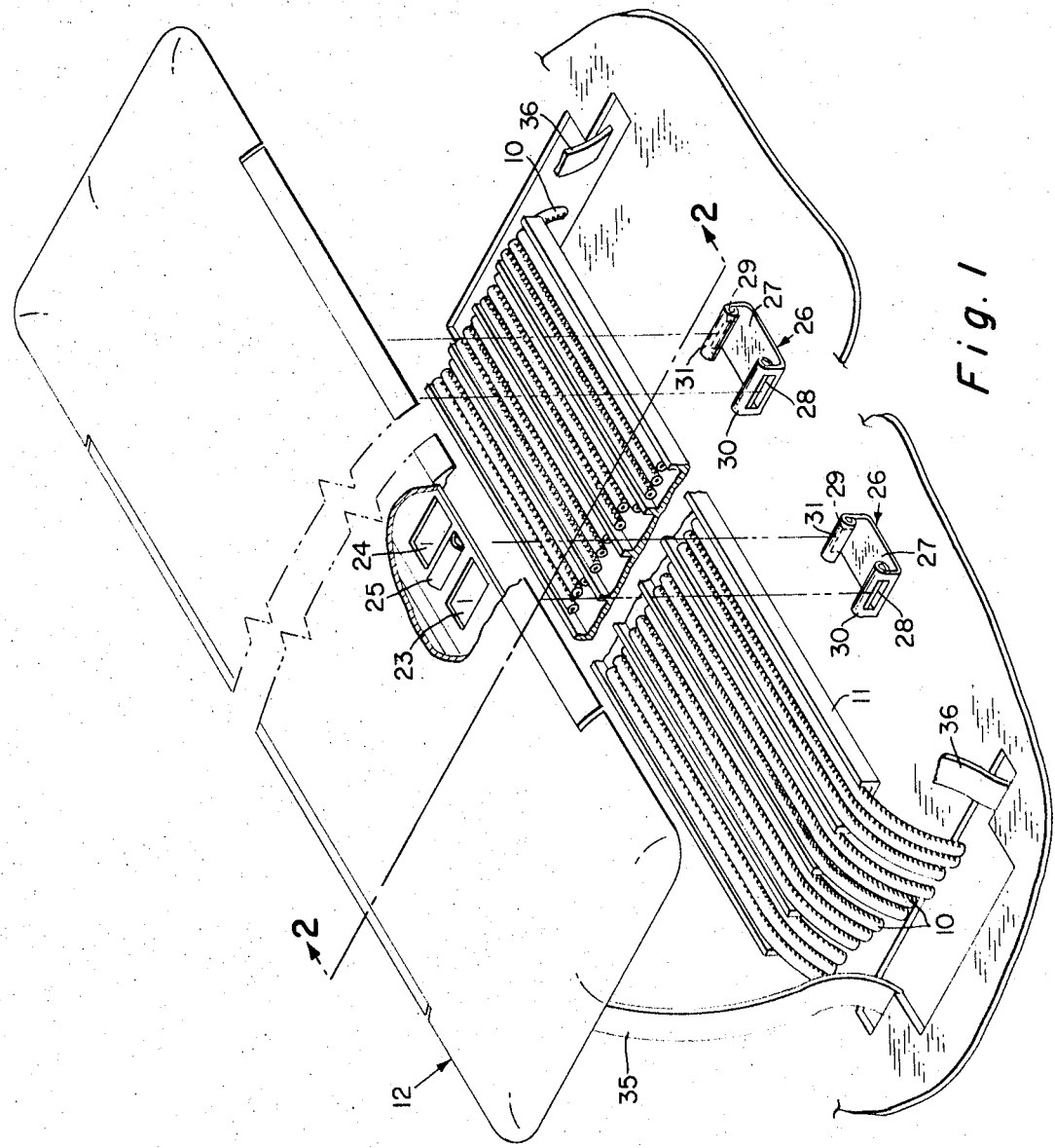
FIG. 1 is a partial, isometric, exploded view, with portions broken away, showing an embodiment of the electrical conductor attachment means of the invention adapted for use with a plurality of individual insulated wire cables.

Individual insulated electrical conductors 10, used to conduct electrical power from one end of a rocket motor in a missile stage to the other end, are arranged in conduit 11 consisting of four channels, as shown in FIGS. 1 and 2. Conduit 11 is made of extruded aluminum and is adapted for use as a conductor cable tray for bench wiring. It also serves as a heat sink to protect conductor cables 10 from excessively high temperatures. The division of conduit 11 into four channels provides mechanical separation for the electrical conductors 10 into four separate groups.

After conduit 11 has been wired, the resulting wired assembly is fixed under a cover, or shroud 12, below a thermal barrier or shield 13. Thermal barrier-shield 13 is bonded, or otherwise suitably fixed to the inside, cavity surface of cover 12, as indicated in FIG. 2. The central, longitudinal fixation of conduit 11 in a middle cavity in cover 12 is accomplished by means of dimples 14, as shown in FIG. 2, formed for pressure locking of the conduit inside the cover.

Cover 12 is made of suitable sheet metal, such as aluminum alloy sheet or sheet steel. It is fabricated by forming two longitudinal edge cavities 15 and 16 by doubling the sheet metal and welding it at 17 and 18, as shown in FIG. 2. This results in the formation of open bottom, middle cavity 19, between edge cavities 15 and 16, for the reception of conduit 11, as described immediately above. The outer surfaces of cover 12 and cavities 15, 16 and 19 are aligned and shaped to form the edges and upper and lower curved surfaces of cover 12, as shown in FIGS. 1 and 2, in accordance with the surface of a rocket motor, upon which the conductors 10 are mounted.

Edge seals 20 and 21 are suitably attached to the opposite edges of cover 12 to seal the cover with the missile surface 22 and to space the cover and the underside of conduit 11 suitably from the missile surface, as shown in FIG. 2. At regular intervals along the underside of cavities 15 and 16 of cover 12, are formed anchor structures consisting of a pair of apertures 23 and 24 formed to either side of a ridge 25, as shown in FIGS. 1 and 3. These anchor structures are designed to cooperate with anchor brackets 26.

Anchor brackets 26 also are made of suitable aluminum alloy sheet or sheet steel. Each anchor bracket 26 is provided with a flat bed portion 27 and two vertical end portions, each provided with a slot 28 and 29, and a rolled portion 30 and 31, respectively. The flat bed portion 27 of each bracket 26 is suitably bonded to the surface, or skin 32, indicated in FIG. 4, of the rocket motor 33 to which the electrical conductor attachment assembly is fastened. In an alternate embodiment, opposed brackets 26 are connected to each other by a connecting strip 34, as shown in FIG. 6.

The assembly of electrical conductors 10, conduit 11 and cover 12 is lashed to the surface 32 of rocket motor 33, by the use of straps 35 and 36. Straps 35 and 36 are made of suitably strong and tough material, such as nylon, or other synthetic fiber, or strip plastics, or steel, or other suitable metal strips. Each strap, 35 or 36, is suitably secured at its ends, as shown in FIG. 4, after being passed, alternately under the underside of either cavity, 15 or 16, and through an assembled anchor structure and anchor bracket 26, as best shown in FIG. 3. In passing through an assembled anchor structure and bracket 26, the strap 35 or 36 passes through an aperture 23 and slot 28, under a rolled portion 30, over a ridge 25, under a rolled portion 31, through a slot 29 and through an aperture 24, as best shown in FIG. 3.

Each end of straps 35 and 36 is secured to a motor expansion compensator assembly, as indicated in FIG. 4. The end of the strap, 35 or 36, is fixed to the head of a bolt 37, as indicated at 38. The stem of bolt 37 is passed through a coil spring 39 disposed in a sleeve 40 fixed to a bracket 41. Bracket 41 is, in turn, secured to the rocket section in any suitable manner, such as by means of fasteners 42. A suitable degree of tension is applied to the strap, 35 or 36, by tightening nut 43 against washer 44 to compress and load coil spring 39. It will be seen that the resilience of coil spring 39 will compensate for any expansion or contraction resulting from heating and cooling, respectively, of rocket motor 33.

In the case of electrical conductors mounted in a flat, flexible electrical conductor cable 45, as shown in FIG. 5, the cable is enclosed between thermal barrier and magnetic shield material sections 46 and 47. The resulting, enclosed cable and shield assembly is suitably fastened to the underside of cover 12 by the use of suitable fasteners, as indicated at 48, with the aid of a cover 49. In other respects, the flexible electrical conductor cable assembly of FIG. 5 is similar to that of the individual insulated electrical conductor assembly of FIGS. 1 to 4, inclusive.

Obviously many modifications and variations of the electrical conductor attachment means of the present invention are possible in the light of the teachings given hereinabove. It is therefore to be understood that within the scope of the appended claims the invention can be practiced otherwise than as specifically described.

We claim:

1. An electrical conductor housing and attachment means comprising:
   an elongate conduit having a hollow interior to receive a plurality of cables arranged in side-by-side relationship;
   a conduit covering shroud having an elongate opening to receive said conduit in nested relationship;
   a plurality of conduit anchoring brackets secured at intervals along a surface to which the conduit is to be attached, each bracket being provided with strap engaging surfaces;
   the undersurface of said shroud being apertured at intervals to receive said conduit anchoring brackets;
   a strap threaded about the strap engaging surfaces of each bracket and through the apertures in the shroud to thereby lash the shroud to the brackets.

2. An electrical housing and attachment means according to claim 1 wherein the elongate conduit is in the form of a multi-grooved channel member having a plurality of longitudinally extending partitions located between the channel side walls to structurally protect separate sets of cables arranged in side-by-side relationship therein.

3. The electrical conductor housing and attachment means according to claim 1 wherein the elongate conduit is provided with electrical insulating shielding which is longitudinally grooved to receive a flat electrical conductor cable assembly and has an electrical insulation shielding strip closing said groove to fully encase said assembly; and
   an elongate structural plate urging said electrical insulation shielding strip into contact with the flat electrical conductor cable.

4. The electrical conductor housing and attachment means according to claim 1 wherein the conduit anchoring brackets include a flat portion for attachment to the surface and spaced upturned end portions which are slotted to receive a strap and the tips of which end portions adjacent each slot are rounded to provide a smoothly curved surface against which the strap will bear when in tension.

5. An electrical conductor housing and attachment means according to claim 1 wherein resilient tensioning means is provided to apply and maintain tension upon the strap so as to compensate for expansion and contraction of said conduit and said surface.

References Cited

FOREIGN PATENTS 757,357  9/1956  Great Britain.

LARAMIE E. ASKIN, *Primary Examiner.*

U.S. Cl. X.R.

174—101